United States Patent [19]
Sheen et al.

[11] Patent Number: 5,628,284
[45] Date of Patent: May 13, 1997

[54] LIVESTOCK CUTTER GATE APPARATUS

[75] Inventors: Joe S. Sheen, Olathe, Kans.; William E. Spencer, Parkville, Mo.

[73] Assignee: Alfa Laval Agri, Inc., Kansas City, Mo.

[21] Appl. No.: 466,211

[22] Filed: Jun. 6, 1995

[51] Int. Cl.⁶ .............................. A01K 29/00; A01K 1/00
[52] U.S. Cl. ..................... 119/840; 119/906; 119/908
[58] Field of Search ................................ 119/840, 906, 119/908

[56] References Cited

U.S. PATENT DOCUMENTS

| | | | |
|---|---|---|---|
| 1,899,320 | 2/1933 | Dupuy. | |
| 3,128,744 | 4/1964 | Jefferts et al. | |
| 3,844,273 | 10/1974 | Myers | 128/2 R |
| 4,000,718 | 1/1977 | Brown | 119/14.03 |
| 4,114,151 | 9/1978 | Denne et al. | 342/44 |
| 4,274,083 | 6/1981 | Tomoeda | 340/825.72 |
| 4,463,353 | 7/1984 | Kuzara | 340/825.54 |
| 4,798,175 | 1/1989 | Townsend et al. | 340/572 |
| 5,183,008 | 2/1993 | Carrano | 119/840 |
| 5,420,757 | 5/1995 | Eberhardt et al. | 361/813 |

FOREIGN PATENT DOCUMENTS

| | | | |
|---|---|---|---|
| 350715 | 2/1991 | Australia | 119/840 |
| 56726 | 1/1981 | European Pat. Off. | 119/840 |
| 3702465 | 8/1988 | Germany. | |
| 2053343 | 2/1981 | United Kingdom. | |
| 8704898 | 8/1987 | WIPO. | |

Primary Examiner—Robert P. Swiatek
Assistant Examiner—Yvonne R. Abbott
Attorney, Agent, or Firm—Hovey, Williams, Timmons & Collins

[57] ABSTRACT

A livestock cutter gate apparatus includes an elongated alley having a first end presenting an entrance and a second end presenting a main exit and a sort exit, and a first air-driven gate positioned in the alley between the main exit and the sort exit. The first gate is shiftable between a sorting position in which it blocks the main exit and opens the sort exit, and a non-sorting position in which it blocks the sort exit and opens the main exit. A pair of saloon gates are positioned in the alley at the entrance and are shiftable between a closed position in which they block the entrance from incoming livestock and an open position in which they open the entrance. An identification system is provided for identifying livestock entering the alley and providing a signal indicative of the presence in the alley of an animal that is to be sorted, and a solenoid-driven spool valve is responsive to the signal for shifting the first gate to the sorting position and the saloon gates to the closed position upon receipt of the signal from the sensor means. An exit gate is positioned in the sort exit and is shiftable between a first position in which the gate in disposed in the path of movement of livestock through the sort exit and a second position in which the gate is removed from the path of movement. The exit gate is moved by livestock passing through the sort exit and is associated with a limit switch that signals the spool valve to actuate the first gate and saloon gates when the exit gate is moved, shifting the first gate to the non-sorting position and the saloon gates to the open position.

16 Claims, 3 Drawing Sheets

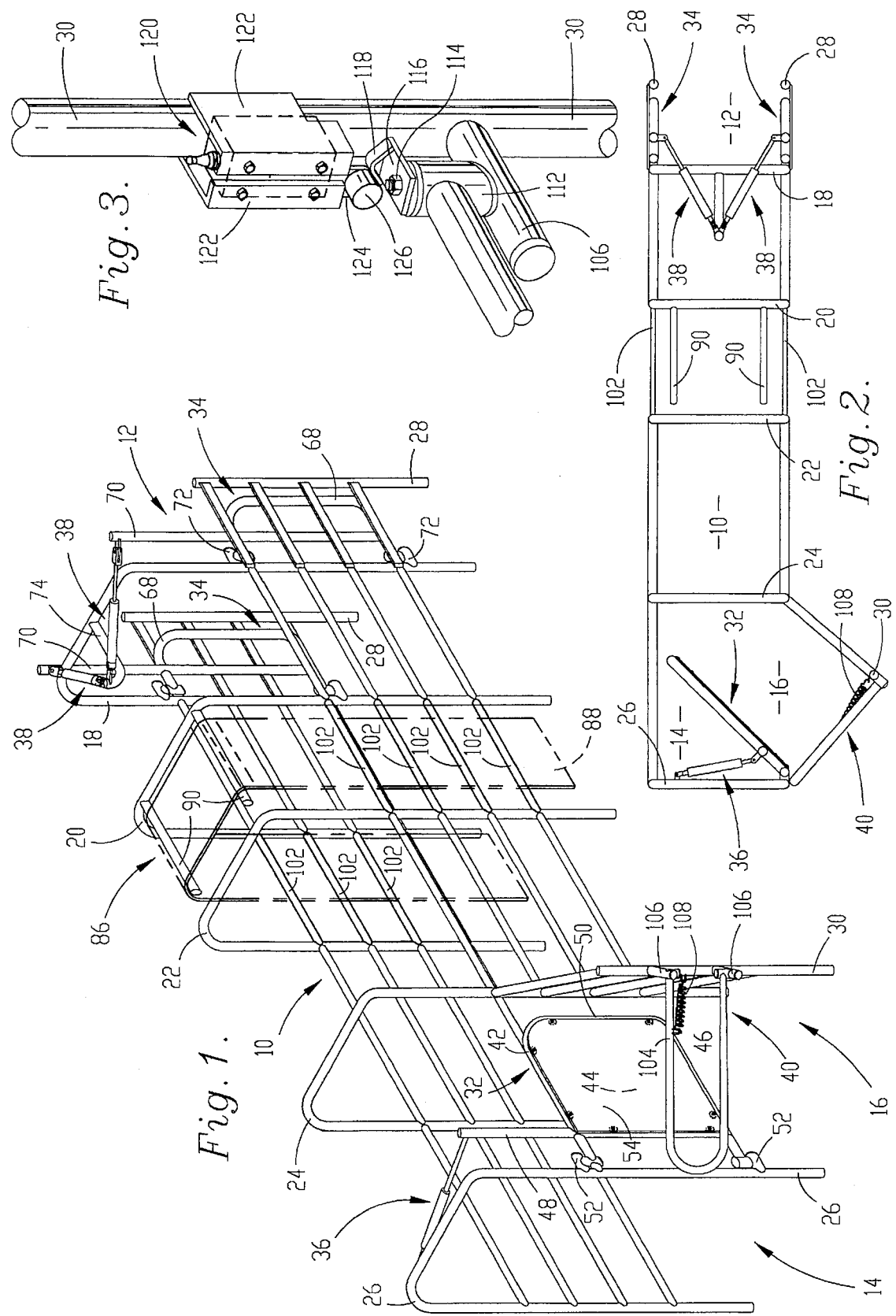

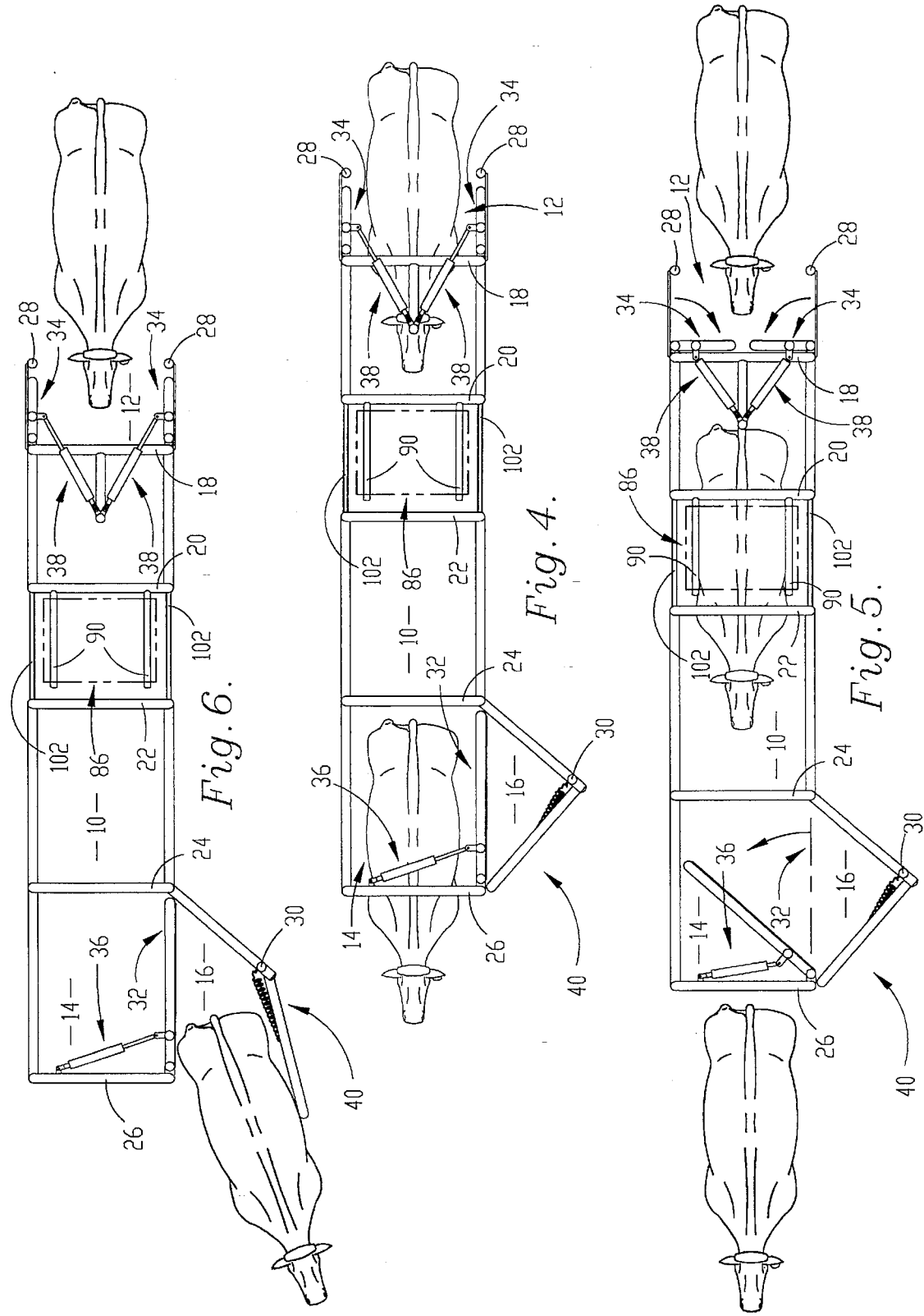

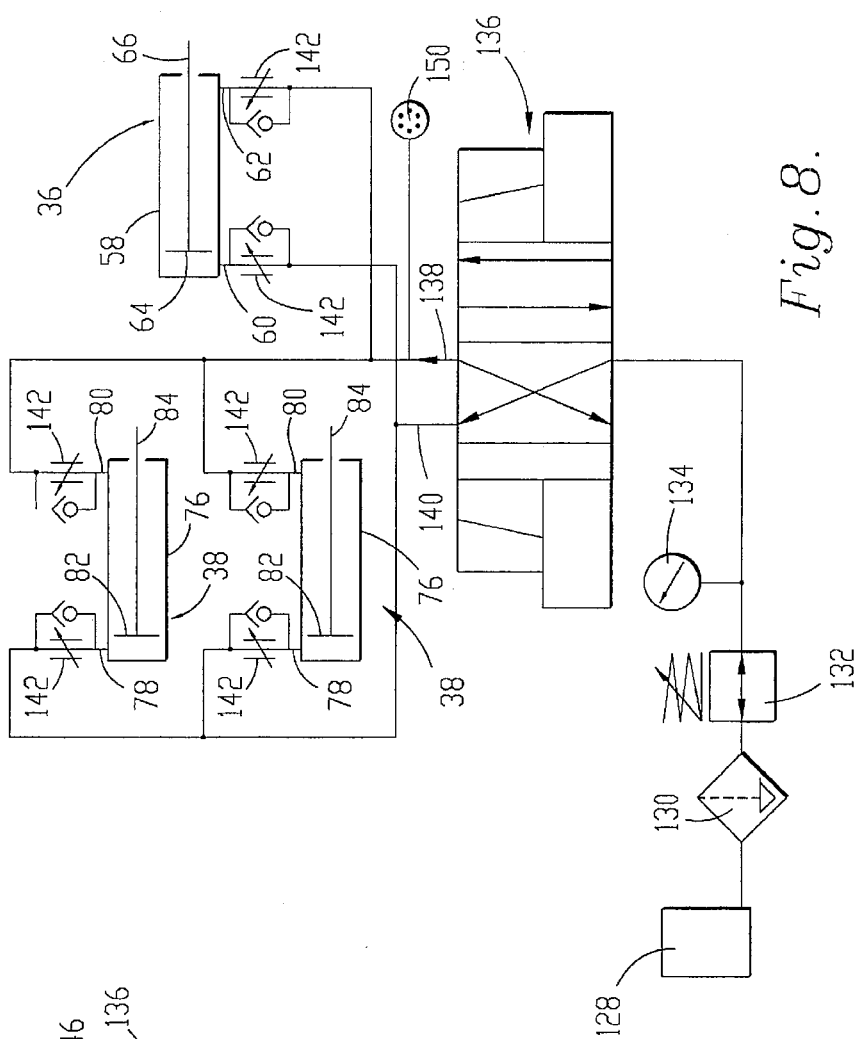
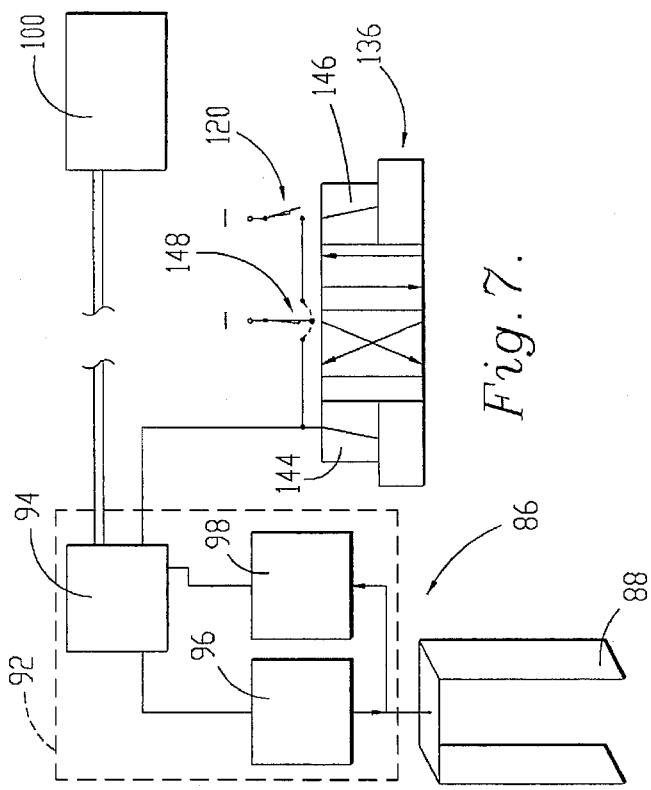
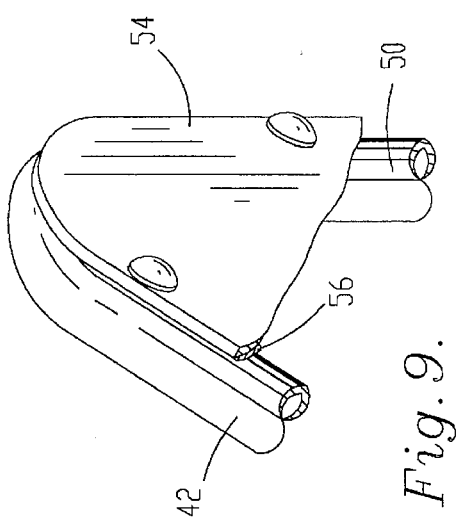

LIVESTOCK CUTTER GATE APPARATUS

BACKGROUND OF THE INVENTION

1. Field of the Invention

The present invention relates generally to livestock handling equipment and, more particularly, to a cutter gate apparatus for automatically identifying and sorting livestock as they walk through the apparatus.

2. Discussion of the Prior Art

It is known to provide a cutter gate apparatus in a daily operation for identifying dairy cows as they leave the milking parlor and sorting them so that selected cows can receive special handling such as periodic medical treatment or the like. The conventional apparatus includes an elongated alley having a first end presenting an entrance and a second end presenting a main exit and a sort exit. An air-driven gate is positioned in the second end of the alley for movement between a sorting position in which the gate blocks the main exit and opens the sort exit, and a non-sorting position in which the gate opens the main exit and closes the sort exit. A pneumatic circuit is provided for actuating the gate and includes an air-driven spool valve for controlling operation of the gate.

An electronic identification system such as that disclosed in U.S. Pat. No. 4,798,175, is provided along the alley for sensing the presence of livestock in the alley and providing an electrical signal when an animal to be sorted is present. An antenna is supported on a curtain that is draped over the alley at a position intermediate the ends, and each animal to be identified by the system wears a transponder that can be detected when the animal passes the antenna. When an animal to be sorted is detected by the identification system, an electrical signal is produced that interfaces with the pneumatic circuit to generate a fluid signal that triggers the spool valve to move the gate to the sorting position.

A one-way gate is provided in the sort exit and includes a pneumatic switch that is actuated when an animal pushes the one-way gate out of the way upon passing through the sort exit. The pneumatic signal from the switch is delivered to the spool valve to move the gate back to the non-sorting position. Thus, the means used to control movement of the gate is completely pneumatic, including the air-driven spool valve, the pneumatic limit switch on the one-way gate, and the interface between the pneumatic spool valve and the electronic identification system.

OBJECTS AND SUMMARY OF THE INVENTION

It is an object of the present invention to provide a cutter gate apparatus incorporating an electrical system for actuating the gates of the apparatus in response to electrical signals received from an identification system and an electrical limit switch forming a part of the apparatus. Such a construction allows coordination of plural cutter gate apparatuses and simplifies remote control and monitoring thereof.

It is another object of the invention to provide a cutter gate apparatus that is easy to install, incorporating adjustable components that can be customized for each installation, and eliminating the need for a complex pneumatic network.

In accordance with these and other objects evident from the following description of a preferred embodiment of the invention, a livestock cutter gate apparatus includes an elongated alley having a first end presenting an entrance and a second end presenting a main exit and a sort exit, and a first air-driven gate positioned in the alley between the main exit and the sort exit. The first gate is shiftable between a sorting position in which it blocks the main exit and opens the sort exit, and a non-sorting position in which it blocks the sort exit and opens the main exit. A pair of air-driven saloon gates are positioned across from one another at the entrance and are shiftable between a closed position in which they block the entrance from incoming livestock and an open position in which they open the entrance. A sensor means is provided for identifying livestock entering the alley and providing a signal indicative of the presence in the alley of an animal that is to be sorted. A control means is responsive to the sensor means for shifting the first gate to the sorting position and the saloon gates to the closed position upon receipt of the signal from the sensor means.

An exit gate is positioned in the sort exit and is shiftable between a first position in which the gate in disposed in the path of movement of livestock through the sort exit and a second position in which the gate is removed from the path of movement. The exit gate includes a biasing means for biasing the exit gate toward the first position, and is movable to the second position by livestock passing through the sort exit. A limit switch is mounted on the exit gate for providing a signal indicative of movement of the exit gate to the second position. The control means actuates the first and second gates in response to the signal from the switch to shift the first gate to the non-sorting position and the second gate to the open position.

By providing a construction in accordance with the present invention, several advantages are realized. For example, by using a cutter gate apparatus having a pair of saloon gates for controlling access to the apparatus, it is possible to insure that each animal entering the alley will be directed to the proper exit, preventing the sensor means from being fooled into cutting one animal in response to a signal generated by the detection of another animal by the sensor means.

Another advantage obtained by employing the present invention resides in the simplification of the pneumatic circuit used to drive the first and second gates, reducing the number of parts used in the apparatus and increasing the reliability thereof.

BRIEF DESCRIPTION OF THE DRAWING FIGURES

The preferred embodiment of the invention is described in detail below with reference to the attached drawing figures, wherein:

FIG. 1 is a perspective view of a cutter gate apparatus constructed in accordance with the preferred embodiment;

FIG. 2 is a top plan view of the apparatus;

FIG. 3 is a fragmentary perspective view of an electrical limit switch forming part of the apparatus;

FIG. 4 is a top plan view of the apparatus, illustrating a condition in which livestock pass through a main exit of the apparatus;

FIG. 5 is a top plan view of the apparatus, illustrating a condition in which an animal is directed to a sort exit of the apparatus;

FIG. 6 is a top plan view of the apparatus, illustrating a condition in which a sorted animal has passed through the sort exit of the apparatus;

FIG. 7 is a schematic view of an electrical control circuit of the apparatus;

FIG. 8 is a schematic view of a pneumatic circuit of the apparatus; and

FIG. 9 is a fragmentary perspective view of a first gate of the apparatus.

DETAILED DESCRIPTION OF A PREFERRED EMBODIMENT

A cutter gate apparatus constructed in accordance with the preferred embodiment is illustrated in FIG. 2, and includes an alley 10 having a first end presenting an entrance 12 and a second end presenting a main exit 14 and a sort exit 16. The alley is formed by five tubular arches 18, 20, 22, 24, 26, each defining a pair of posts positioned on opposite sides of the alley from one another, and by four vertically-spaced, longitudinally extending rails extending along each side of the alley between the posts. An additional pair of posts 28 are provided on either side of the entrance to define an extension beyond the first arch 18, and a further post 30 is provided in the sort exit so that rails can be extended at least partially along the length of the sort exit toward an aisle downstream of the alley. The apparatus further includes a first gate 32 positioned in the alley between the main exit and the sort exit, a pair of second gates 34 positioned in the alley at the entrance, cylinder assemblies 36, 38 for shifting the gates 32, 34 between their various positions, and an exit gate 40 positioned in the sort exit and being shiftable by livestock pushing past the gate.

The first gate 32 is shiftable between a sorting position, shown in FIGS. 2 and 5, in which it blocks the main exit 14 and opens the sort exit 16, and a non-sorting position, shown in FIGS. 4 and 6, in which the first gate blocks the sort exit and opens the main exit. With reference to FIG. 1, the first gate is constructed of three vertically spaced, horizontally extending arms 42, 44, 46 and a pair of horizontally spaced, vertical posts 48, 50. The upper and lower arms 42, 46 extend beyond the vertical post 48 to define short arm segments that are supported on the inner post of the arch 26 disposed between the main exit and the sort exit. The post of the arch 26 includes a pair of short tubular arms 52 extending horizontally in a direction parallel to the alley, and the arm segments of the gate are supported on the arms of the post by vertically extending fasteners that permit the gate to pivot about them. A plate is 54 fastened to the gate across the area defined by the posts and arms, and prevents livestock from seeing through the gate into the main exit when the gate is in the sorting position. As illustrated in FIG. 9, the plate 54 is riveted to the gate, and a rubber gasket 56 or the like is interposed between the plate and the gate to dampen any banging between the plate and gate when the gate is moved.

Returning to FIG. 1, the vertical post 48 of the gate 32 is parallel to and spaced several inches from the vertical pivot axis of the gate, and extends beyond the upper arm 42 to a height substantially equal to the height of the arch 26. The post 48 defines a means by which the gate is shifted between the sorting and non-sorting positions by the first cylinder assembly 36, which is supported between the arch 26 and the post 48. As shown schematically in FIG. 8, the cylinder assembly 36 includes a pneumatic cylinder 58 having ports 60, 62 at each end, and a piston 64 movable within the cylinder between the ports. However, any fluid actuated cylinder assembly could be employed. A rod 66 is connected for movement with the piston and extends from the cylinder, as shown in FIG. 1. When the piston and rod are extended from the cylinder, the gate 32 is moved to the non-sorting position and when the piston and rod are retracted the gate is moved to the sorting position.

The second gates 34 are saloon gates supported on opposite sides of the alley at the entrance 12. The saloon gates are shiftable toward and away from one another between a closed position in which they block the entrance from incoming livestock and an open position in which they expose the entrance. Each saloon gate is supported on one of the posts of the entrance arch 18 for pivotal movement about a vertical axis, and includes a U-shaped tubular member 68 presenting a pair of vertically spaced, horizontally extending ends, and a vertical post 70. Each gate 34 has a width equal to about one-half the width of the alley so that when the gates are closed they block the entrance without interfering with one another. The advantage obtained by using saloon gates at the entrance to the alley resides in the ability of such gates to be shut quickly without trapping livestock or allowing them to slip past the gate during closure.

Each post of the entrance arch 18 includes a pair of short tubular arms 72 extending horizontally in a direction parallel to the alley, and the ends of the U-shaped member of the gate 34 extend several inches beyond the vertical post 70 and are supported on the arms 72 of the arch 18 by vertically extending fasteners that permit the gate to pivot about them. The vertical post 70 of each saloon gate extends upward beyond the U-shaped member 68 to a height substantially equal to the height of the arch 18 and defines a means by which the gate is shifted between the open and closed positions by the air cylinder assembly 38 associated with the gate. A J-shaped frame element 74 is attached to the top of the arch over the alley and supports the cylinder assemblies 38. Thus, each cylinder assembly extends between the element 74 and the vertical post 70 of one of the saloon gates. As shown in FIG. 8, each cylinder assembly 38 includes a pneumatic cylinder 76 having ports 78, 80 at each end, and a piston 82 movable within the cylinder between the ports. However, any fluid actuated cylinder assembly could be employed. A rod 84 is connected for movement with the piston and extends from the cylinder, as shown in FIG. 1. When the pistons and rods are extended from the cylinders the saloon gates 34 are shifted to the open position and when the pistons and rods are retracted the gates are closed.

A sensor means is provided along the alley at a position intermediate the ends for identifying livestock entering the alley and providing an electrical signal indicative of the presence in the alley of an animal that is to be sorted. The sensor means preferably includes an electronic identification system 86 such as is disclosed in U.S. Pat. No. 4,798,175, the disclosure of which is incorporated herein by this express reference, and includes a transponder worn by each animal to be handled by the apparatus, and an antenna 88 suspended beside the alley for sensing the presence of one of the transponders as it is moved past the antenna. The antenna 88 is secured to a curtain that is suspended over the alley by support structure 90. As shown in FIG. 7, the identification system also includes a controller 92 that is made up of a central processing unit 94, an energization control 96 and a decoder 98 for receiving and decoding signals from the antenna and outputting them to a central processing unit 100.

The alley 10 is constructed in such a way that it is free of metal in the region occupied by the antenna 88, and includes non-metal rails 102 extending between the arches 20, 22 to prevent livestock from escaping. Preferably, the rails are fiberglass rods provided outside the curtain for supporting the curtain and preventing livestock from escaping the alley. The fiberglass rods do not interfere with operation of the identification system. Other nonmetallic materials could be used in place of fiberglass so long as they provide the same functions. Alternately, a rigid antenna construction could be employed that blocks livestock from escaping the alley.

The exit gate 40 is spaced from the first gate 32 along the sort exit 16, and is shiftable between a first position in which the gate is disposed in the path of the movement of the livestock through the sort exit and a second position in which the gate is removed from the path of movement. The gate 40 is preferably formed of a U-shaped tubular member 104 presenting horizontally extending arms that are connected to arms 106 of the post 30 for pivotal movement about a vertical axis. The exit gate 40 includes a biasing means in the form of a tension spring 108 or the like for biasing the exit gate toward the first position. The spring is connected between the gate and the post 30.

The exit gate 40 is generally free to pivot about the vertical pivot axis and it does not include any drive means for shifting the gate back and forth within the sort exit. Rather, the gate 40 is movable to the second position by livestock passing through the sort exit, and is returned to the first position by the spring 108. The exit gate bears against the arch 26 in the first position so that livestock are prevented from pushing the exit gate back into the alley.

As shown in FIG. 3, each end of the U-shaped member 104 includes a short vertical tubular segment 112 that defines the pivot axis of the gate, and each of these tubing segments are supported on one of the arms 106 of the post 30 by a bearing assembly. A cam plate 116 is supported on the tubing segment of the lower end of the U-shaped member 104 for movement with the gate 40 about the pivot axis. The cam plate includes an inverted V-shaped cam 118 that is secured to the plate. An electrical limit switch 120 is mounted on the post 30 above the lower end of the U-shaped member 104 by brackets 122 and includes a movable switch closure member 124 that depends from the switch a short distance. A roller 126 is provided on the lower end of the closure member and is adapted to engage the cam 118 as the gate moves toward the second position to close the switch.

The angular orientation of the cam plate 116 relative to the exit gate is adjustable by loosening the fastener 114 and repositioning the plate before tightening the fastener again. In this manner, it is possible to change the point of opening of the gate at which the limit switch is closed in order to provide the desired timing of movement of the first gate to the non-sorting position and of the second gate to the open position.

The pneumatic circuit used for supplying pressurized air to the cylinder assemblies is shown in FIG. 8, and includes a source of pressurized air 128, a filter 130, a regulator 132, a pressure gauge 134, and a solenoid-driven spool valve 136 to which the pressurized air is supplied. The regulator is used to maintain the pressure of the air in the system at between 30–50 psi., and the gauge allows monitoring of this pressure. A first line 138 extends between the spool valve and the ports 62, 80 of the cylinders 58, 76 and a second line 140 extends between the spool valve and the ports 60, 78 of the cylinders. When air is supplied to the first line 138, the pistons and rods of the cylinder assemblies 36, 38 are retracted, causing the first gate 32 to move to the sorting position and closing the saloon gates 34. Alternately, when air is supplied to the second line 140, the pistons and rods of the cylinder assemblies are extended, shifting the first gate 32 to the non-sorting position and opening the saloon gates 34. Adjustable quick exhaust valves 142 are provided on all of the ports 60, 62, 78, 80 of the cylinders 58, 76 for controlling the speed with which air is exhausted from the cylinders during movement of the pistons and rods in both directions. In this manner, operation of the cylinder assemblies can be accelerated, reducing the risk of livestock slipping past the gates before being properly sorted.

The solenoid-driven spool valve 136 includes a valve that is movable between a first position in which air is supplied to the first line 138 and a second position in which air is supplied to the second line 140. Solenoids 144, 146 are provided on each end of the valve for driving the valve between the first and second positions, and these solenoids are included in the control circuit of the apparatus, as shown in FIG. 7. The control circuit also includes the antenna 88 and controller 92, the limit switch 120, a manually operated switch 148, and the central processing unit 100. for controlling operation of the circuit.

The manually operated switch 148 is connected directly between the power supply and the solenoids, and includes a three-position toggle switch that is movable between an open position, a first closed position providing current to the solenoid 144, and a second closed position providing current to the solenoid 146. The switch 148 can be positioned remote from the gates, and allows an operator to shift the gates 32, 34 between their positions manually. An indicator 150 is provided adjacent the manually operated switch, preferably in the form of a pressure indicator in the pneumatic circuit, for providing a visual indication of the position of the gates 32, 34 at any given moment so that the operator will know the status when standing at the switch. This permits the switch to be positioned out of the line of sight of the apparatus while permitting control thereof.

With reference to FIG. 4, normally, as livestock are directed through the apparatus, they enter the alley at the entrance 12 and walk through the alley to the main exit 14. The saloon gates 34 are open and the first gate 32 is in the non-sorting position so that livestock can enter the alley and are led from the main exit. As each animal passes the antenna 88, the transponder worn by the animal is sensed, and a signal indicative of the particular animal is supplied to the processor 94 where it is compared to a list of identification signals indicative of livestock to be sorted. Typically, this list is supplied to the processor by the central processing unit 100. If the animal is not to be sorted, nothing happens, and the animal is allowed to pass on through the alley and out the main exit. However, when the signal supplied to the processor matches with a stored identification signal indicative of livestock to be sorted, the processor 100 energizes the solenoid 144, causing air under pressure to be supplied to the port 62 of the cylinder 58 to move the first gate 32 to the sorting position, and to the ports 80 of the cylinders 76 to close the saloon gates, as shown in FIG. 5.

Movement of the gates 32, 34 to these positions forces the animal in the alley to exit the sort exit 16 instead of the main exit 14, and prevents other animals from entering the alley. After the animal to be sorted has passed through the sort exit, it pushes past the exit gate 40, causing closure of the limit switch 120, as shown in FIG. 6. A signal is thereby provided to the processor 100 which triggers energization of the solenoid 146 so that air is supplied to the port 60 of the cylinder 58 to return the first gate 32 to the non-sorting position, and to the ports 78 of the cylinders 76 to open the saloon gates 34. Thereafter, livestock are allowed to enter the alley for further sorting.

If at any time an operator wants to change the positions of the gates from a remote control position, the manually operated switch 148 can be moved to either of the closed positions, energizing the appropriate solenoid. This permits operation of the apparatus to be monitored, and enables the operator to manually correct for any particular circumstance that may arise during automated operation of the apparatus.

Although the present invention has been described with reference to the preferred embodiment illustrated in the attached drawing figures, it is noted that substitutions may be made and equivalents employed herein without departing from the scope of the invention as recited in the claims. For example, it is possible to provide a sensing means that generates a signal indicative of the presence of an animal to be sorted every time a collar or tag worn by an animal is detected. In accordance with this construction, collars or tags would only be placed on animals to be sorted and the need for a processing unit for comparing sensed signals to a previously stored list of signals representative of animals to be cut is eliminated.

Further, it is possible to employ a second sensor means for identifying livestock exiting the sort exit and providing a signal indicative of the passage of an animal past the first gate through the sort exit in order to confirm proper sorting.

The present invention represents a single gate component that can be combined with other gates and handling equipment to achieve a desired herd management system. For example, a scale can be employed within the entrance of the apparatus for weighing livestock, and a signal indicative of the sensed weight of each animal can be used to control whether the animal is sorted. This construction permits automation of yet another step of livestock handling that previously required human attention.

What is claimed is:

1. A livestock cutter gate apparatus comprising:
   an elongated alley including a first end presenting an entrance and a second end presenting a main exit and a sort exit;
   a first gate positioned in the alley between the main exit and the sort exit, the first gate being shiftable between a sorting position in which the first gate blocks the main exit and opens the sort exit, and a non-sorting position in which the first gate blocks the sort exit and opens the main exit;
   a first air cylinder assembly for shifting the first gate between the sorting and non-sorting positions;
   a pair of saloon gates positioned on opposite sides of the alley from one another at the entrance and being shiftable between a closed position in which the saloon gates block the entrance from incoming livestock and an open position in which the saloon gates open the entrance to incoming livestock;
   a second air cylinder assembly for shifting the saloon gates between the closed and open positions;
   a sensor means for identifying livestock entering the alley and providing a signal indicative of the presence in the alley of an animal that is to be sorted;
   a control means responsive to the sensor means for actuating the first and second cylinder assemblies to shift the first gate to the sorting position and the saloon gates to the closed position upon receipt of the signal from the sensor means that an animal to be sorted is in the alley;
   an exit gate positioned in the sort exit and being shiftable between a first position in which the gate in disposed in the path of movement of livestock through the sort exit and a second position in which the gate is removed from the path of movement, the exit gate including a biasing means for biasing the exit gate toward the first position, and being movable to the second position by livestock passing through the sort exit; and
   a limit switch associated with the exit gate for providing a signal indicative of movement of the exit gate to the second position, the control means actuating the first and second cylinder assemblies in response to the signal from the switch to shift the first gate to the non-sorting position and the saloon gates to the open position.

2. The apparatus as recited in claim 1, wherein the control means includes a solenoid-driven spool valve movable between a first position in which the first cylinder assembly shifts the first gate to the sorting position and the second cylinder assembly shifts the saloon gates to the closed position, and a second position in which the first cylinder assembly shifts the first gate to the non-sorting position and the second cylinder assembly shifts the saloon gates to the open position.

3. The apparatus as recited in claim 2, wherein the control means includes a central processor unit for receiving the signals from the sensor means and the limit switch, and for supplying electrical signals to the solenoid-driven spool valve to move the valve between the first and second positions.

4. The apparatus as recited in claim 1, wherein the limit switch is supported on the apparatus adjacent the exit gate and includes a movable closure member for closing the switch as the exit gate is moved toward the second position, the exit gate including a camming means for camming the closure member closed, and an adjustment means for adjusting the position of the camming means to adjust the point at which the switch closes during movement of the exit gate toward the second position.

5. The apparatus as recited in claim 1, wherein the sensor means includes a transponder worn by each animal to be handled by the apparatus, and an antenna supported beside the alley for sensing the presence of one of the transponders as it is moved past the antenna, the alley being free of metal in a region occupied by the antenna and including non-metal rails in the region to prevent livestock from escaping.

6. The apparatus as recited in claim 5, wherein the distance between the second gate and the antenna of the sensor means is between 22.5–46.5 inches.

7. The apparatus as recited in claim 5, wherein the distance between the sort exit and the antenna of the sensor means is between 34.5–58.5 inches.

8. The apparatus as recited in claim 1, wherein the control means includes a manual actuating means for actuating the first and second cylinder assemblies to shift the first gate between the sorting and non-sorting positions and the saloon gates between the closed and open positions upon receipt of a manual input.

9. The apparatus as recited in claim 8, further comprising an indicator means adjacent the manual actuating means for providing a visual indication of the position of the first and second gates.

10. A livestock cutter gate apparatus, comprising:
    an elongated alley including a first end presenting an entrance and a second end presenting a main exit and a sort exit;
    a first gate positioned in the alley between the main exit and the sort exit, the first gate being shiftable between a sorting position in which the first gate blocks the main exit and opens the sort exit, and a non-sorting position in which the first gate blocks the sort exit and opens the main exit;
    a first air cylinder assembly for shifting the first gate between the sorting and non-sorting positions;
    a pair of saloon gates positioned on opposite sides of the alley from one another at the entrance and being shiftable between a closed position in which the saloon gates block the entrance from incoming livestock and an open position in which the saloon gates open the entrance to incoming livestock;

a second air cylinder assembly for shifting the saloon gates between the closed and open positions;

a sensor means for identifying livestock entering the alley and providing a signal indicative of the presence in the alley of an animal that is to be sorted;

a control means responsive to the sensor means for actuating the first and second cylinder assemblies to shift the first gate to the sorting position and the saloon gates to the closed position upon receipt of the signal from the sensor means that an animal to be sorted is in the alley, the control means including a manual actuating means for actuating the first and second cylinder assemblies to shift the first gate between the sorting and non-sorting positions and the saloon gates between the closed and open positions upon receipt of a manual input;

an indicator means adjacent the manual actuating means for providing a visual indication of the position of the first and second gates, wherein the indicator means senses the air pressure in the first and second cylinder assemblies, and provides a visual indication of the position of the cylinder assemblies;

an exit gate positioned in the sort exit and being shiftable between a first position in which the gate in disposed in the path of movement of livestock through the sort exit and a second position in which the gate is removed from the path of movement, the exit gate including a biasing means for biasing the exit gate toward the first position, and being movable to the second position by livestock passing through the sort exit; and a limit switch associated with the exit gate for providing a signal indicative of movement of the exit gate to the second position, the control means actuating the first and second cylinder assemblies in response to the signal from the switch to shift the first gate to the non-sorting position and the saloon gates to the open position.

11. The apparatus as recited in claim 1, further comprising an air supply means for supplying air to the first and second cylinder assemblies at 30–50 psi.

12. The apparatus as recited in claim 1, wherein the exit gate is a one-way gate that includes a means for preventing the gate from being moved from the first position in a direction away from the second position by livestock that have already passed through the sort exit.

13. The apparatus as recited in claim 1, wherein the second cylinder assembly includes two separate cylinder units, each associated with one of the saloon gates.

14. The apparatus as recited in claim 1, further comprising an exhaust means for quickly exhausting air from the first and second cylinder assemblies during shifting of the first and second gates so that the gates move quickly between positions.

15. The apparatus as recited in claim 1, wherein the first gate includes a face plate that blocks the view of the main exit by livestock being sorted.

16. A livestock cutter gate apparatus comprising:

an elongated alley including a first end presenting an entrance and a second end presenting a main exit and a sort exit;

a first gate positioned in the alley between the main exit and the sort exit, the first gate being shiftable between a sorting position in which the first gate blocks the main exit and opens the sort exit, and a non-sorting position in which the first gate blocks the sort exit and opens the main exit, the first gate including a face plate that blocks the view of the main exit by livestock being sorted;

dampening means for dampening the sound made by the first gate when it is moved to the sorting and non-sorting positions;

a first air cylinder assembly for shifting the first gate between the sorting and non-sorting positions;

a pair of saloon gates positioned on opposite sides of the alley from one another at the entrance and being shiftable between a closed position in which the saloon gates block the entrance from incoming livestock and an open position in which the saloon gates open the entrance to incoming livestock;

a second air cylinder assembly for shifting the saloon gates between the closed and open positions;

a sensor means for identifying livestock entering the alley and providing a signal indicative of the presence in the alley of an animal that is to be sorted;

a control means responsive to the sensor means for actuating the first and second cylinder assemblies to shift the first gate to the sorting position and the saloon gates to the closed position upon receipt of the signal from the sensor means that an animal to be sorted is in the alley;

an exit gate positioned in the sort exit and being shiftable between a first position in which the gate in disposed in the path of movement of livestock through the sort exit and a second position in which the gate is removed from the path of movement, the exit gate including a biasing means for biasing the exit gate toward the first position, and being movable to the second position by livestock passing through the sort exit; and a limit switch associated with the exit gate for providing a signal indicative of movement of the exit gate to the second position, the control means actuating the first and second cylinder assemblies in response to the signal from the switch to shift the first gate to the non-sorting position and the saloon gates to the open position.

* * * * *